Patented Dec. 10, 1929

1,739,388

UNITED STATES PATENT OFFICE

WILBUR B. DEXTER, OF LAKEWOOD, OHIO, ASSIGNOR TO NATIONAL CARBON COMPANY, INC., A CORPORATION OF NEW YORK

GAS-PERMEABLE AND WATERPROOFING COMPOSITION

No Drawing.   Application filed October 7, 1927.   Serial No. 224,776.

The invention is a gas pervious sealing compound adapted for sealing dry-battery cells.

In the manufacture of dry-batteries it is customary to close each individual cell with sealing compound to prevent the escape of electrolyte and moisture. The most common type of cell is assembled in a zinc container or can and the sealing compound is poured into a space left for the purpose at the top. Largely through accident the joint between the sealing compound and the zinc can is not hermetically tight and the gases liberated within the cell are vented principally through this joint. This method of venting the cell gases is unsatisfactory because the size of the vent is not uniform and it is not subject to satisfactory control during the process of manufacture. Therefore, the object of this invention is to provide a sealing compound that will effectively seal the electrolyte and moisture in the cell and also permit the cell gases to escape at a rate that may be controlled during the manufacture of the cell.

I have found that a sealing compound comprising paraffin and napthalene has the property of being impermeable to the aqueous electrolyte and pervious to the gases evolved in dry battery cells thereby sealing the electrolyte in the cells while permitting the gases to escape. The quantity of napthalene in the compound is preferably from 25% to 50% of the weight of the whole but other proportions may be used according to the degree of porosity required, the porosity increasing with the napthalene content. When the cell is large and the surface of the seal relatively small the porosity of the compound should be greater than when the cell is small and the seal surface relatively large.

The sealing compound may be hardened by the addition of one of the harder waxes such as Montan wax which has a higher melting point than the paraffin-napthalene compound and prevents it from flowing at the higher atmospheric temperature. I have found paraffin 60%, napthalene 30%, and Montan wax 10% by weight to be satisfactory. Also, fillers such as sand, pumice, Sil-O-Cel, and bentonite may be added to increase the rigidity of the sealing compound and I have secured satisfactory results from a composition of paraffin 25%, napthalene 25%, and bentonite 50% by weight.

This sealing compound may also be used to impregnate battery, and battery cell, gas venting members made from paper, fabric and the like and they are thereby rendered impermeable to the aqueous electrolyte and pervious to the battery gases the same as the sealing compound. For this purpose I have secured the best results with a composition of paraffin and naphthalene in which the naphthalene content was between 40% and 60% of the weight of the mixture but other proportions may be used.

In preparing the compound I have encountered no difficulty. The waxes may be melted in the containers ordinarily used and the filler may then be added and mixed by stirring. The compound may be poured into the cells in the usual manner.

These porous sealing and water-proofing compounds may be used in many places and in various ways and I do not limit myself to those described as they are merely typical examples showing their wide field of application.

I claim:

1. A sealing composition consisting of ingredients solid at ordinary temperatures and containing paraffine wax and sufficient naphthalene to render the compound gas-pervious when solid.

2. A sealing composition consisting of ingredients solid at ordinary temperatures and containing paraffine wax and 25% to 50% of naphthalene.

3. A sealing composition consisting of ingredients solid at ordinary temperatures and containing paraffine wax and a wax of higher melting point, and sufficient naphthalene to render the compound gas-pervious when solid.

4. A sealing composition consisting of ingredients solid at ordinary temperatures and containing paraffine wax, an inorganic filler, and sufficient naphthalene to render the compound gas-pervious when solid.

In testimony whereof, I affix my signature.

WILBUR B. DEXTER.